«12» United States Patent [19]
Iitsuka

[11] Patent Number: 5,790,015
[45] Date of Patent: Aug. 4, 1998

[54] SECURITY APPARATUS

[75] Inventor: Yoshiyuki Iitsuka, Iwaki, Japan

[73] Assignee: Alpine Electronics, Inc., Tokyo, Japan

[21] Appl. No.: 525,445

[22] Filed: Sep. 8, 1995

[30] Foreign Application Priority Data

Sep. 14, 1994 [JP] Japan .................................. 6-219902

[51] Int. Cl.$^6$ .................................................. B60R 25/00
[52] U.S. Cl. ................... 340/426; 340/425.5; 307/10.4;
180/287
[58] Field of Search ........................ 340/425.5, 426,
340/428, 429, 530, 541, 542, 825.32, 551,
552, 553; 307/10.2, 10.3, 10.4; 180/287

[56] References Cited

U.S. PATENT DOCUMENTS

| | | | |
|---|---|---|---|
| 3,852,614 | 12/1974 | Carlson | 307/10.2 |
| 4,486,806 | 12/1984 | Mochida et al. | 307/10.4 |
| 4,673,914 | 6/1987 | Lee | 180/287 |
| 4,763,121 | 8/1988 | Tomoda et al. | 340/825.54 |
| 5,194,756 | 3/1993 | Darbesio | 180/287 |
| 5,227,764 | 7/1993 | Umemoto | 340/552 |
| 5,307,048 | 4/1994 | Sonders | 340/425.5 |
| 5,334,969 | 8/1994 | Abe et al. | 340/426 |
| 5,369,394 | 11/1994 | Quirk et al. | 340/551 |
| 5,420,568 | 5/1995 | Iida et al. | 180/287 |
| 5,500,637 | 3/1996 | Kokubu | 340/425.5 |
| 5,534,845 | 7/1996 | Issa et al. | 340/426 |

*Primary Examiner*—Brent A. Swarthout
*Assistant Examiner*—Van T. Trieu
*Attorney, Agent, or Firm*—Guy W. Shoup

[57] ABSTRACT

A security apparatus which automatically locks a door even though a door locking operation is not performed. A security controller drives a door lock device to automatically lock a door if the door is not locked even when a lapse of time exceeds a set time and if a detection signal is not output from a radar sensor after the door has been unlocked. With this arrangement, even when a driver unlocks the door intending to get in the vehicle, but decides not to do so, and also when he/she leaves the vehicle without performing an arming operation, the door can be automatically locked.

20 Claims, 7 Drawing Sheets

SECURITY APPARATUS

BACKGROUND OF THE INVENTION

1. Field of the Invention

The present invention relates to a security apparatus which locks and unlocks a door by remote control via a remote control unit. More particularly, the invention relates to a security apparatus which automatically performs an arming operation by use of a proximity sensor, such as an infrared sensor, a radar sensor or the like, even when an arming operation is inadvertently not performed.

2. Description of the Related Art

Vehicle security systems are rapidly coming into wide use as one measure taken against increasingly frequent occurrences of vehicle theft and acts of vandalism.

A conventional vehicle security system typically operates as follows. A portable controller (remote control unit) is carried by a driver and is manipulated to generate either an activation (arming) command or a de-activation (disarming) command. When an arming command is transmitted, a security apparatus on the vehicle enters an active (armed) security state and generates control signals in response to the arming command to lock the vehicle doors. In the active security state, if an authorized person (such as a burglar) attempts to open the door or shakes the vehicle during the security operation, these actions are detected by sensors mounted on the vehicle. In response to signals generated by the sensors indicating unauthorized activity, the security apparatus generates control signals which cause an audible alarm to sound or the headlights to blink, thereby repelling the burglar. On the other hand, when the driver manipulates a disarming key of the remote control unit in order to access the vehicle, the security apparatus enters a disarmed state, and generates control signals in response to the arming command to unlock the vehicle doors.

In this manner, the conventional vehicle security system provides a convenient method for carrying out door locking/unlocking operations by remote control, and also for sounding an alarm to repel burglars who move, lift, or shake the vehicle, or attempt to open a door or trunk, break the window, or otherwise illegally enter the vehicle while the security apparatus is in an active state.

Another advantage of the conventional vehicle security system is that arming/disarming commands can be carried out only by an authorized remote control unit transmitting an ID code which coincides with a preset ID code stored in the memory of security apparatus which is mounted on the vehicle.

However, the above-described conventional security system encounters the following problem when the user leaves the vehicle and inadvertently fails to activate the security apparatus (that is, the door remains unlocked). This can occur, for example, (1) when the driver unlocks the door intending to get in the vehicle, but then decides not to do so, and leaves the vehicle without performing an arming operation, or (2) when the driver leaves the vehicle while the door remains unlocked due to an erroneous operation of the remote control unit, for example, when the driver leaves the vehicle without noticing that a disarming operation has been inadvertently performed after an intended arming operation was performed. In such cases, the security system is useless, and the vehicle is extremely vulnerable to theft and acts of vandalism.

In order to solve the above-described problem, some conventional security systems include a door opening/closing sensor which detects whether a vehicle door is opened or closed. These security systems automatically locks the vehicle door when the door is closed, an ignition switch is not turned on, and after a predetermined time period has elapsed (for example, some dozens of seconds) since a disarming operation has been performed (this is referred to herein as a door relocking operation). With this arrangement, even when the user inadvertently fails to perform an arming operation, the door can be reliably locked and the security apparatus reliably activated.

Figure 7:
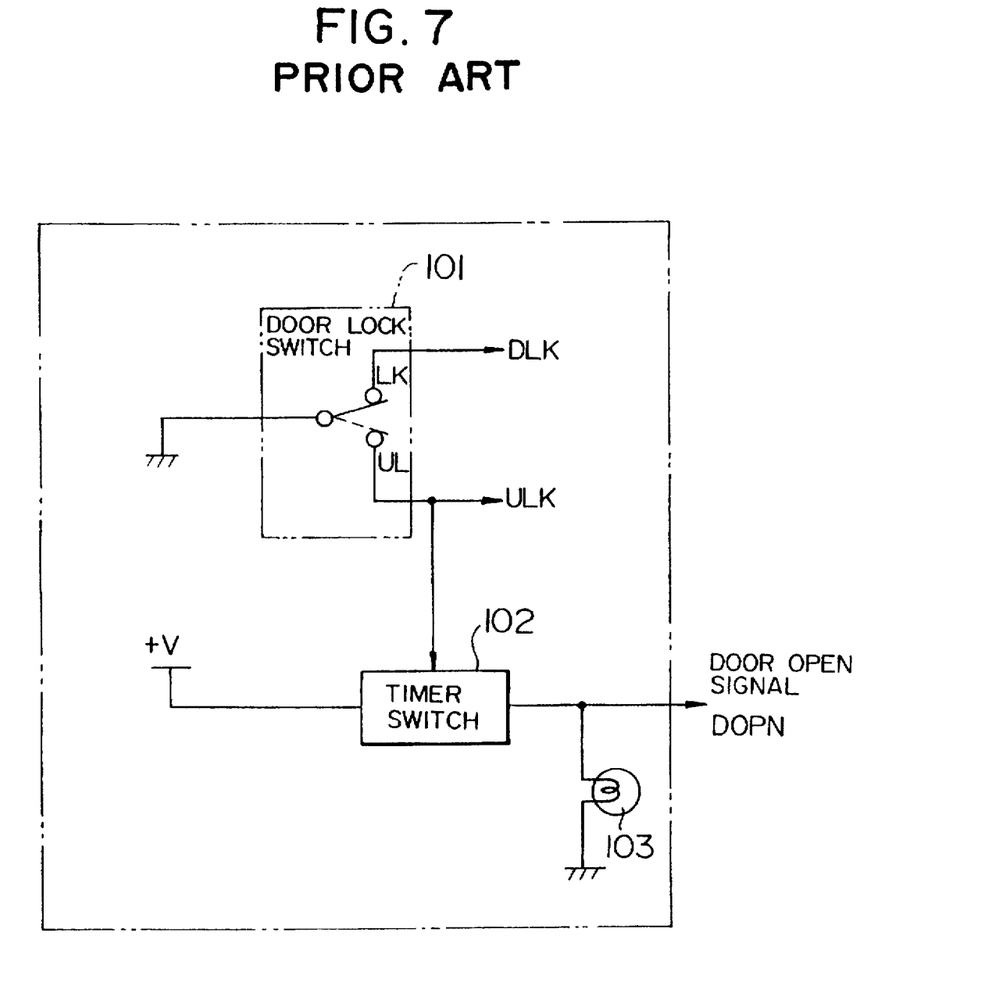
FIG. 7 is a schematic view illustrating a conventional circuit for outputting a door open signal.

However, some security systems are not provided with a door opening/closing sensor of the above-described type. For example, the conventional security system shown in FIG. 7 includes a door lock switch 101 for detecting a door locked/unlocked state, a timer switch 102 and a dome light 103. With this construction, the system operates as follows. When the system enters an unlocked state (ULK="0") in response to a disarming operation, the timer switch 102 is turned on and is maintained in the on-state to light the dome light 103 for a certain time (some dozens of seconds). At the same time, a door open signal DOPN is output. In the security system of this type, when the door is unlocked by a disarming operation, the door open signal DOPN is immediately output, thus making it impossible to perform a relocking operation.

SUMMARY OF THE INVENTION

Accordingly, an object of the present invention is to provide a security apparatus which automatically performs a door relocking operation even when the apparatus is used in a security system which is not provided with a door opening/closing sensor.

In order to achieve the above object, a security apparatus is provided in accordance with the present invention for locking/unlocking a door by remote control via a remote control unit. The security apparatus includes a door lock switch for generating a door-unlocked signal when the door changes from a locked state to an unlocked state, a sensor for detecting movement within a monitored area adjacent the door and for generating one of a first detection signal in response to detected movement within the monitored area, and a second detection signal in the absence of detected movement within the monitored area, a security controller for generating a door lock command signal when the sensor continuously generates the second detection signal for a predetermined time period following the generation of the door-unlocked signal by the door lock switch, and door lock/unlock means for locking the door in response to the door lock command signal.

The security apparatus of the present invention is constructed such that the door can be automatically locked after a predetermined period of time following an unlocking operation and when movement in a monitored area is not detected by the sensor, such as a radar sensor. With this construction, a vehicle door can be automatically locked even when the driver unlocks the door intending to get in the vehicle but decides not to do so, or even when the driver leaves the vehicle without performing a locking operation. Also, the door can be automatically locked even when the driver leaves the vehicle while the door remains unlocked because of an erroneous operation of the remote control unit, for example, when the driver leaves the vehicle without noticing that a disarming operation has been inadvertently carried out after the arming operation was performed.

DESCRIPTION OF THE PREFERRED EMBODIMENT (a) Overall Construction

Figure 1:
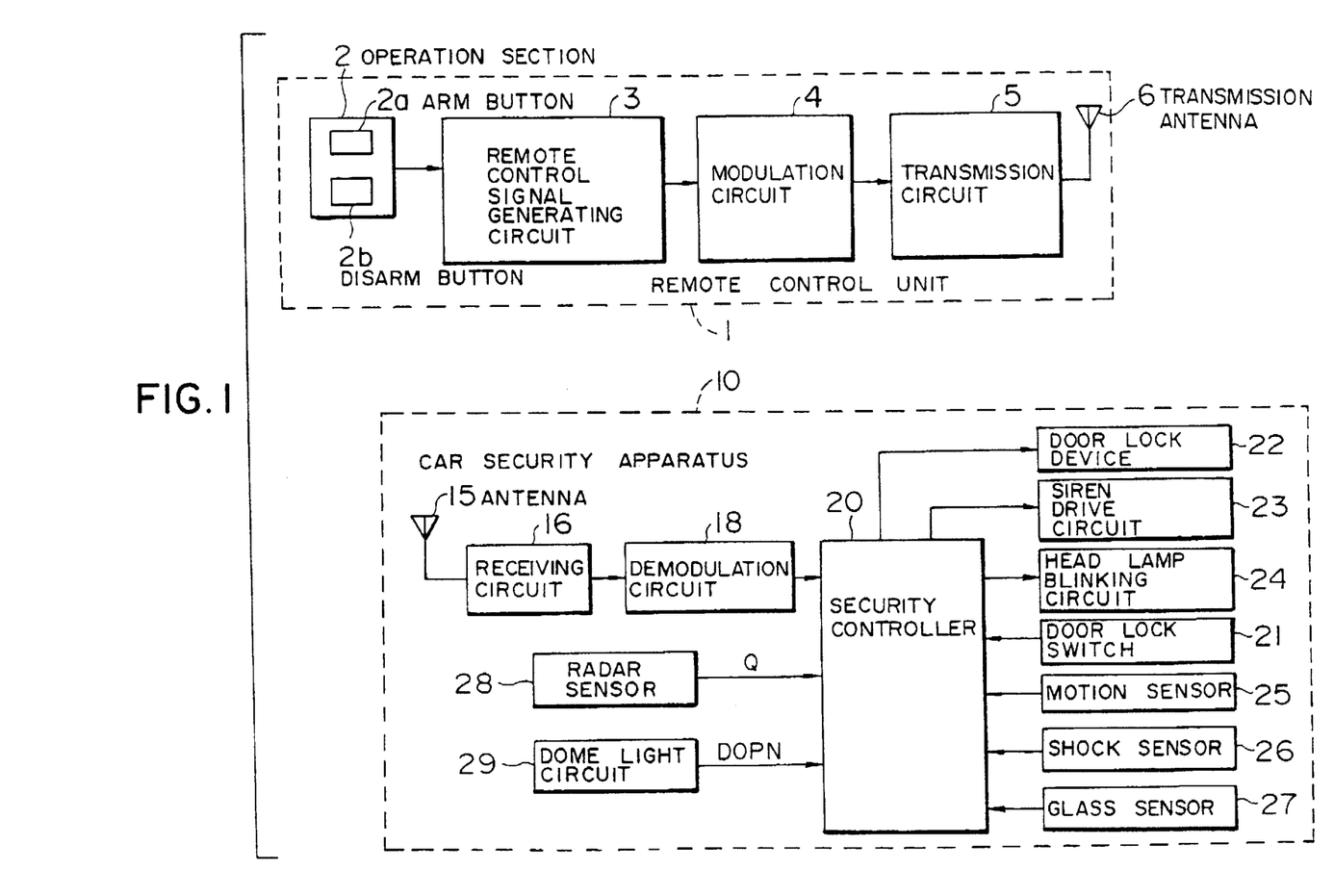
FIG. 1 is a schematic view illustrating the overall construction of a vehicle security system according to the present invention.

FIG. 1 is a schematic view illustrating the overall construction of a vehicle security system according to the present invention.

Referring to FIG. 1, a hand controller (remote control unit) 1 includes: an operation section 2 provided with keys such as an arming key 2a, a disarming key 2b and the like; a remote control signal generating circuit 3 for generating a remote control signal including a command code in accordance with an operated key; a modulation circuit 4 for generating a modulation signal by modulating a carrier wave, based on the remote control signal, according to a predetermined modulation system, such as phase modulation, FSK modulation or the like; and a transmission circuit 5 for receiving the modulation signal and further making frequency changes and electric power amplifying the modulation signal prior to transmission via a transmission antenna 6.

A vehicle security apparatus 10 mounted on a vehicle includes: a receiving antenna 15, a receiving circuit 16 for effecting high-frequency amplification, frequency changes and the like to the received signal transmitted from the remote control unit 1; a demodulation circuit 18 for demodulating the received signal to produce a digital remote control signal; a security controller 20 for executing security control based on the digital remote control signal; a door lock switch 21 for detecting whether a door is locked or unlocked, and for generating either a door-locked signal when the door is locked or a door-unlocked signal when the door is unlocked; and a door lock device 22 for locking/unlocking the door. The door lock device 22 includes a door lock/unlock mechanism, an actuator for driving the mechanism, and an actuator drive circuit, all of which are not shown. The vehicle security apparatus 10 also includes: a siren drive circuit 23; a headlamp blinking circuit 24; a motion sensor 25; a shock sensor 26; a glass sensor 27; a radar sensor 28 used as a proximity sensor which is disposed inside a vehicle so as to detect that someone is moving inside the vehicle and to output a detection signal Q; and a dome light circuit 29 for lighting a dome light and also for outputting a door open signal DOPN. In a presently preferred embodiment of the present invention, the security controller 20 includes a μPD6124 microprocessor produced by NEC Corporation of Tokyo, Japan.

(b) Radar Sensor

Figure 2:
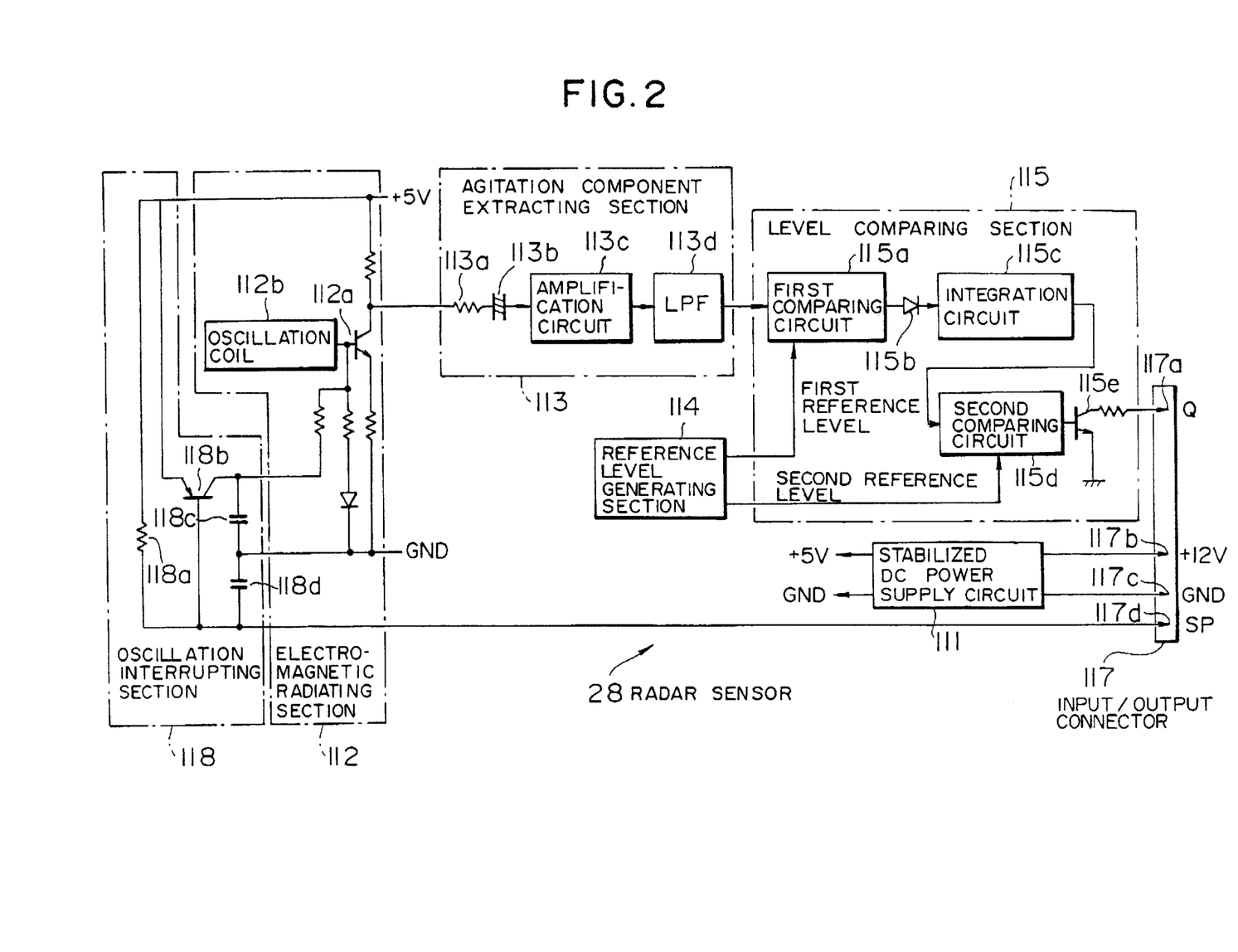
FIG. 2 is a circuit diagram illustrating an example of the specific construction of a radar sensor used in the vehicle security system.
Figures 3A, 3B:
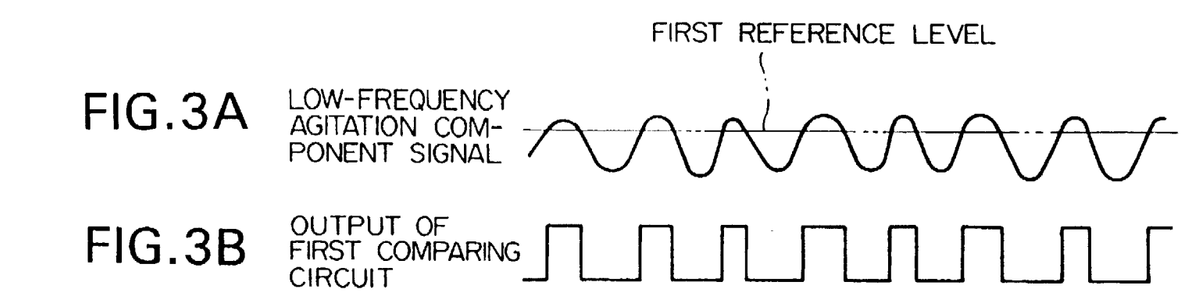
FIG. 3 is a timing chart illustrating the operation of a level comparing section of the radar sensor.
Figure 3C:
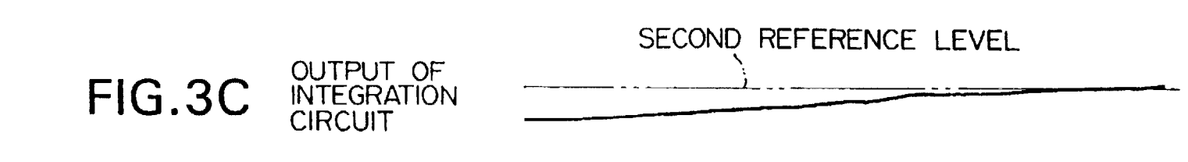
Figure 3D:
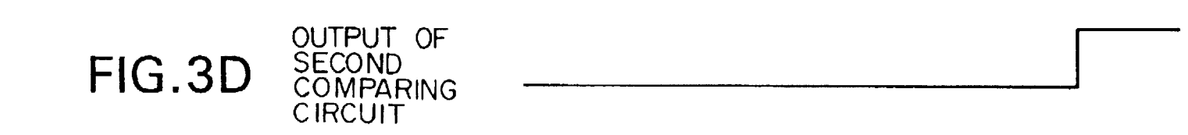
Figure 3E:
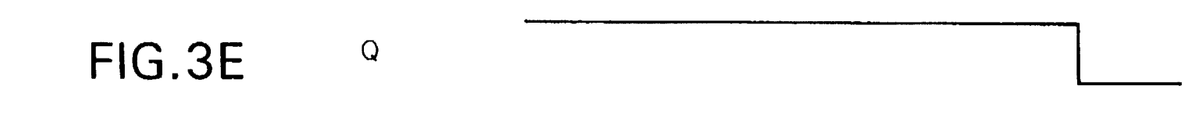
Figure 4A:
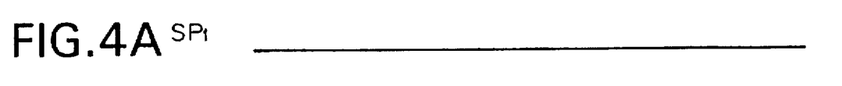
FIG. 4 is a timing chart illustrating a specific example of sensitivity-controlling pulse signals.
Figure 4B:
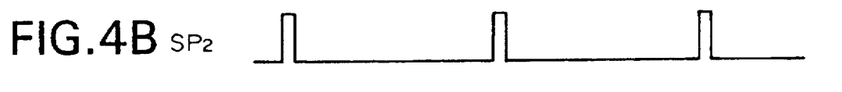
Figure 4C:
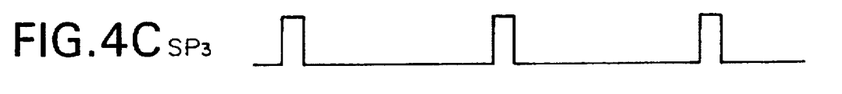
Figure 4D:
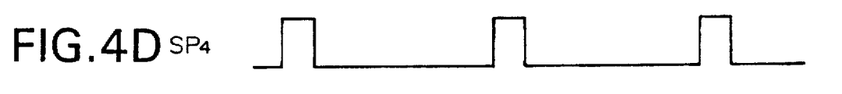
Figure 4E:
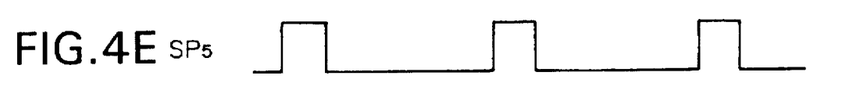
Figure 4F:
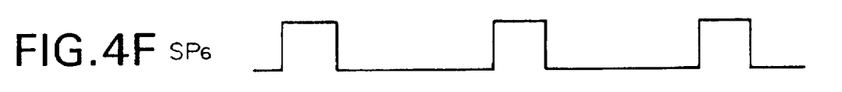
Figure 4G:
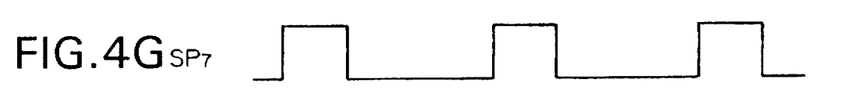
Figure 4H:
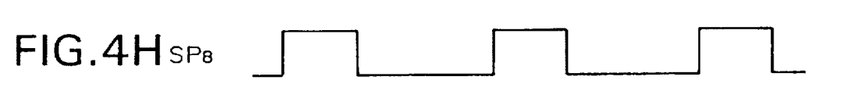
Figure 4I:
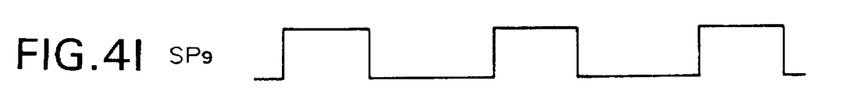
Figure 4J:
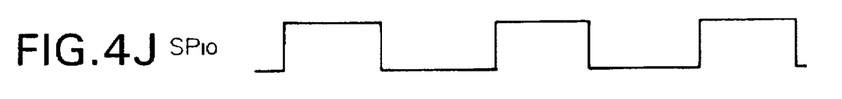

FIG. 2 is a circuit diagram illustrating the specific construction of the radar sensor 28. A stabilized DC power supply circuit 111 receives a voltage of +12V therein and produces a stabilized voltage of +5V. An electromagnetic radiating section 112 includes a microwave generating GaAsFET 112a and an oscillation coil 112b formed of a distributed parameter circuit so as to oscillate in a high-frequency range, for example, at 2.45 GHz. During oscillation, the oscillation coil 112b serves as an antenna so as to radiate an electromagnetic wave therearound. If someone is moving within a range of the radiated electromagnetic wave, a low-frequency agitation is produced in the wave. This agitation changes the load applied to the antenna of the electromagnetic wave radiating section 112, which further adds a low-frequency agitation component to a collector voltage of the GaAsFET 112a.

An agitation component extracting section 113 includes: a detection resistor 113a for detecting fluctuations of the collector voltage of the GaAsFET 112a; a DC eliminating capacitor 113b; an amplification circuit 113c for amplifying a fluctuation component of the collector voltage; and a low-pass filter 113d for extracting a low-frequency agitation component contained in the collector voltage so as to output a low-frequency agitation component signal.

The radar sensor 28 also includes a reference level generating section 114 and a level comparing section 115. The level comparing section 115 receives the extracted electromagnetic wave agitation component signal and compares it with a predetermined reference level provided by the reference level generating section 114. When a low-frequency agitation component signal which is greater than the reference level continues for a certain period of time, the comparing section 115 outputs the detection signal Q to the security controller 20 (FIG. 1).

In accordance with one embodiment of the present invention, the level comparing section 115 includes a first comparing circuit 115a which compares the low-frequency agitation component signal extracted in the agitation component extracting section 113 with a predetermined first reference level provided by reference level generating section 114, and outputs a high signal level when the extracted signal exceeds the first reference level. The high signal level is passed through a reverse-blocking diode 115b to an integration circuit 115c, which integrates an output from the reverse-blocking diode 115b. A second comparing circuit 115d outputs a high signal level when the output from the integration circuit 115c exceeds a predetermined second reference level provided by the reference level generating section 114, and switches an open collector transistor 115e on so as to output a low-level detection signal Q to the security controller 20 (FIG. 1).

FIG. 3 shows operation waveforms for the level comparing section 115. The low level detection signal Q is output only when a low-frequency agitation component signal in excess of the first reference level continues for a predetermined period of time. In contrast, the detection signal Q is not output when the agitation component signal continues only for a short period of time.

An input/output connector 117, which is attached to the case of the radar sensor 28, is connected to the security controller 20 via a cable (not shown). The connector 117 includes a detection signal output terminal 117a, a +12V power supply input terminal 117b, a ground terminal 117c, and a sensitivity-controlling pulse input terminal 117d. An oscillating operation interrupting section 118 receives sensitivity-controlling pulse signals SP at a predetermined frequency from the security controller 20 via the sensitivity-controlling pulse input terminal 117d, the pulse signals SP having ten levels of the duty ratio in the order from a smaller degree to a larger degree (see $SP_1$–$SP_{10}$ in FIG. 4), thereby interrupting the oscillating operation of the electromagnetic wave radiating section 112 according to the input pulse signal. It should be noted that the sensitivity-controlling pulse $SP_1$ is a continuous low level signal (a duty ratio of 0%).

The oscillating operation interrupting section 118 includes: a pull-up resistor 118a connected to the stabilized +5V source for biasing the sensitivity-controlling pulse signals SP received through the pulse input terminal 117d; a transistor 118b having a base connected to the biased pulse signals SP; and capacitors 118c and 118d connected in series between the collector of transistor 118b and the biased pulse signals SP. When the pulse signal SP is at a low level, the transistor 118b is turned on and the GaAsFET 112a is also turned on, thereby causing the electromagnetic wave radiating section 112 to oscillate. On the other hand, when the pulse signal SP is raised to a H level, the transistor 118b is turned off and the GaAsFET 112a is also turned off so as to interrupt the oscillation of the electromagnetic wave radiating section 112. With this arrangement, the electromagnetic wave radiating section 112 interrupts the oscillating operation according to the duty ratio of the pulse signal SP. The pulse signal SP has a frequency (for example, 125 Hz) which is much higher than a low-frequency agitation component contained in an electromagnetic wave, which component is generated by detected movement. Because of this high frequency, a fluctuation component contained in the collector voltage of the GaAsFET 112a caused by the interruption of the oscillating operation is suppressed in the low-pass filter 113d of the agitation component extracting section 113, which would otherwise be output to the level comparing section 115.

The oscillation period of the magnetic wave radiating section 112 is controlled by the duty ratio of the pulse signals SP. That is, the greater the duty ratio of the pulse signals SP, the smaller the oscillation period of the electromagnetic wave radiating section 112, thus decreasing the output level of the agitation component extracting section 113. This makes it difficult for the low-frequency agitation component signal to exceed the first reference level in the level comparing section 115, thus causing a decrease in the acceleration speed of the output level of the integration circuit 115c. This further makes it difficult for an output from the integration circuit 115c to exceed the second reference level, thereby inhibiting a detection signal Q from being output through the open collector transistor 115e. In other words, the sensitivity of the radar sensor 28 is varied inversely proportional to the duty ratio of the pulse signals SP.

(c) Security Operation

The vehicle security system is operated by the following process. After the driver exits the vehicle and shuts the door, he/she presses the arming key 2a of the remote control unit 1. The remote control unit 1 modulates a carrier wave according to a digital remote control signal, including an ID code, an arming code (command codes), so as to transmit a radio wave signal. The receiving circuit 16 of the security apparatus 10 installed inside the vehicle receives the radio wave signal from the remote control unit 1, the demodulation circuit 18 demodulates received signal and passes the demodulated signal to the security controller 20. The security controller 20 compares the ID code contained in the received signal with an ID code which is stored in the apparatus. When the two ID codes coincide with each other, the controller 20 drives the door lock device 22, thereby allowing it to perform an arming operation (locking operation) according to the arming code, and also initiating a vehicle security operation or anti-theft state.

In this anti-theft state (arming state), the security controller 20 monitors an occurrence of an abnormality based on inputs from various sensors, such as the door lock switch 21, the motion sensor 25, the shock sensor 26, the glass sensor 27, the radar sensor 28 and the like. More specifically, for example, if a burglar shakes or moves a vehicle during an attempt to steal or burglarize the vehicle during the arming state, the motion sensor 25 and the shock sensor 26 detect such movement and shock, respectively. Or, when the burglar attempts to open the door, smash the glass, or enter the vehicle, the door lock switch 21, the glass sensor 27 and the radar sensor 28 detect the above actions, respectively. When the security controller 20 receives an abnormality signal from any sensor, it causes the siren drive circuit 23 to sound a siren, or alternatively, the security controller 20 drives the headlamp blinking circuit 24 causing it to blink a headlamp and to issue an alarm, thereby repelling the burglar.

On the other hand, when the driver who has returned to the vehicle presses the disarming key 2b, the remote control unit 1 modulates a carrier wave according to a digital remote control signal, including an ID code, a disarming code (command codes), so as to transmit a radio wave signal in a manner similar to the arming operation. The vehicle security apparatus 10 receives the radio wave transmitted from the remote control unit 1 and demodulates it. Subsequently, the controller 20 compares the ID code contained in the received signal with the stored ID code. When the two codes coincide with each other, the controller 20 cancels the anti-theft state and executes a disarming operation (allowing the door lock device 22 to perform an unlocking operation).

(d) Relocking Control

Figure 5:
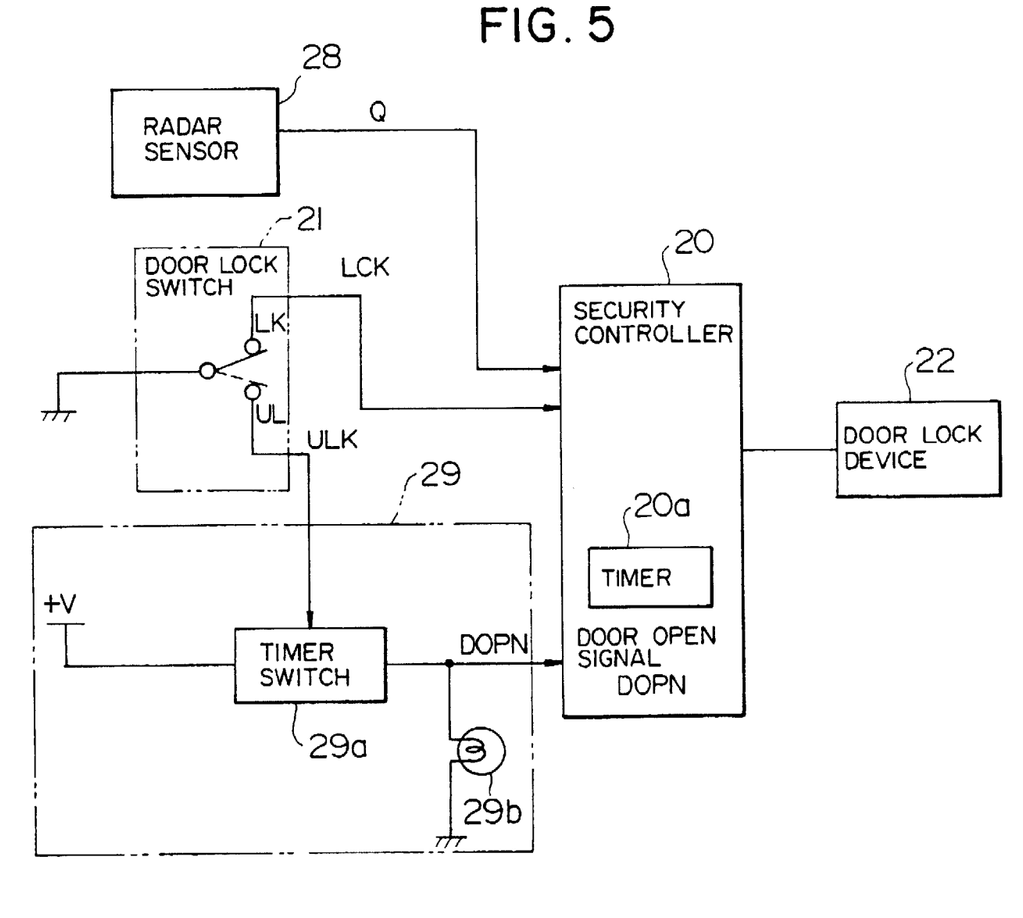
FIG. 5 is a schematic view showing the vehicle security system to illustrate a relocking operation.

FIG. 5 is a schematic block diagram of the security apparatus 10 to illustrate the relocking operation. FIG. 5 shows the security controller 20, the door lock switch 21, the door lock device 22, the radar sensor 28 and a dome light circuit 29.

The door lock switch 21 outputs a door lock signal LCK when the door is locked, and outputs an unlock signal ULK when the door is unlocked. The dome light circuit 29 has a timer switch 29a and a dome light 29b which is maintained in an on state for a certain time (some dozens of seconds) after the door has been unlocked. A door open signal DOPN is output from the timer switch 29a.

Figure 6:
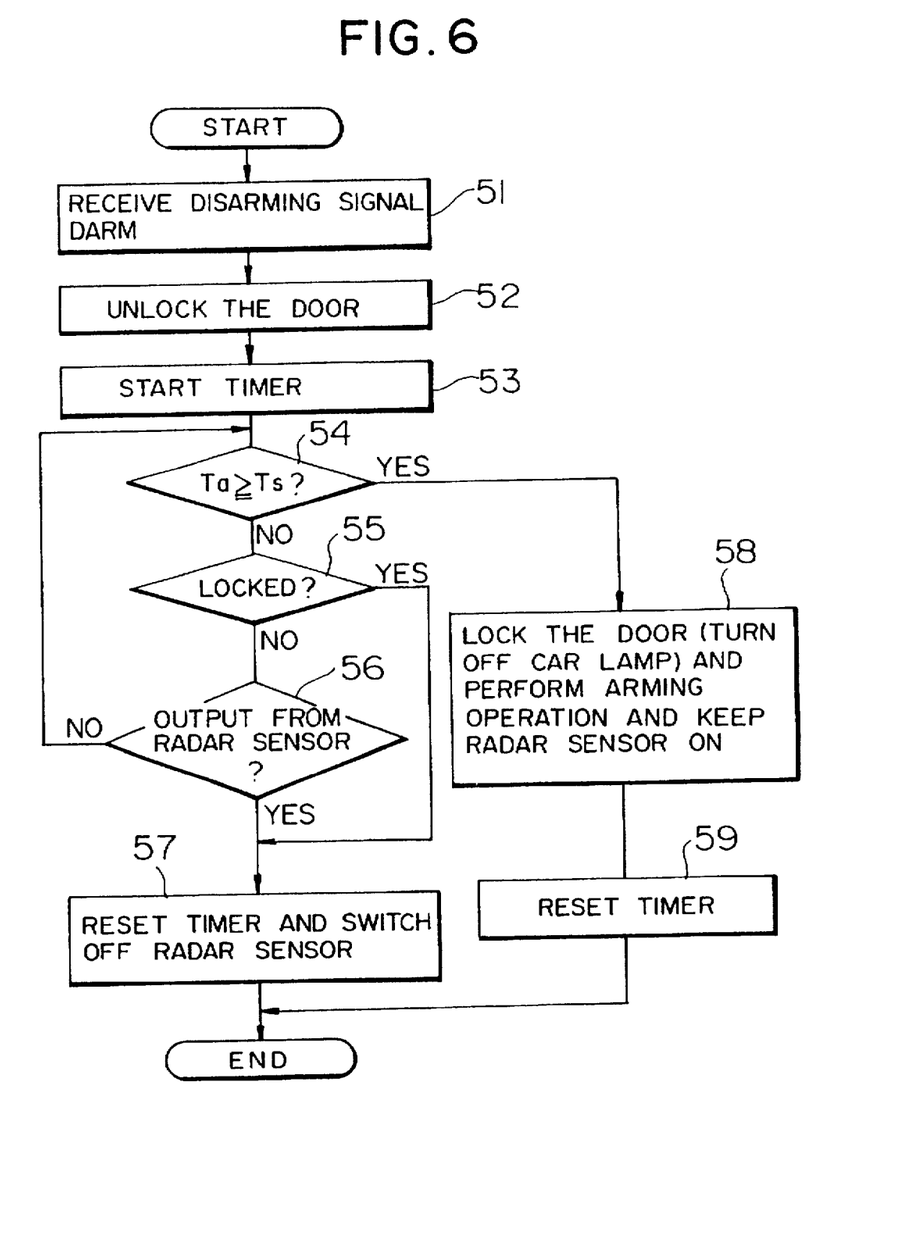
FIG. 6 is a flow chart of a relocking control process.

FIG. 6 is a flow chart of the relocking control process executed by the security controller 20.

When the security controller 20 receives a disarming signal from the remote control unit 1 (step 51), the security controller 20 drives the door lock device 22 causing the door to unlock (step 52), and also starts the timer 20a causing it to measure a lapse of time Ta (step 53). Simultaneous with the above-described steps, the timer switch 29a is turned on, the dome light 29b is lit, and the door open signal DOPN is input into the security controller 20.

The security controller 20 determines whether the lapse of time Ta is equal to or greater than a set time Ts (step 54). When Ta is smaller than Ts, the security controller 20 determines whether the door is locked (step 55). If the door is not locked, the security controller 20 monitors whether a detection signal Q is output from the radar sensor 28 (step 56). As has been discussed above, the radar sensor 28 outputs the detection signal Q when it detects that someone is moving inside the vehicle.

When it is determined that the detection signal Q is not output, the flow returns to step 54 and repeats the subsequent steps of the process. If the door is locked, or if the radar sensor 28 detects that someone is moving inside the vehicle before the lapse of time Ta exceeds the set time Ts, the timer 20a is reset, and at the same time, the radar sensor 28 is turned off (step 57), thus completing the control processing without performing a relocking operation. The above-mentioned step 57 is executed when the driver locks the door or enters the vehicle after the disarming operation has been performed.

In contrast, if the door has not yet been locked after the time Ta exceeds the set time Ts, or if the detection signal Q is not output from the radar sensor 28, the answer in step 54 is "YES". In this case, the security controller 20 drives the door lock device 22 causing it to automatically lock the door, and at the same time, the controller 20 keeps the radar sensor 28 on and performs the arming operation (step 58). Subsequently, the timer 20a is reset (step 59). The relocking control has thus been accomplished. According to the above-described control process, even when (1) the driver unlocks the door intending to get in the vehicle but decides not to do so, and leaves the vehicle without performing an arming operation, or (2) the driver leaves the vehicle while the door remains unlocked because of an erroneous operation of the remote control unit, for example, when the driver leaves the vehicle without noticing that a disarming operation has been accidentally carried out after the arming operation was performed, the door will be automatically locked and a security operation will be automatically performed.

An explanation has been given of an application of the present invention to the vehicle security system. The present invention is also applicable to door relocking control or the like in a home security system.

Also, in the above embodiment, it is determined whether the driver has entered the vehicle, only in consideration of a detection signal output from the radar sensor. It may be determined, however, whether the driver has entered the vehicle, based on a combination of an output from the radar sensor and the operational state of the ignition switch.

Further, although in this embodiment the remote control unit is used to open and close the door, the door lock may be manually locked and unlocked, which modification is also applicable to a relocking operation required when the driver forgets to lock the door after he/she has unlocked the door.

Although the invention has been described in its preferred form by way of this embodiment, it is our intention that the invention be not limited by any of the details of description, and that various changes and modifications may be made in the invention without departing from the spirit and scope of the appended claims.

As will be clearly understood from the foregoing description, the present invention offers the following advantages.

The invention is constructed in such a manner that the door can be automatically locked when the door has not yet been locked after a predetermined time period after an unlocking operation was performed and when a detection signal is not output from the radar sensor. With this construction, the door can be automatically locked even when the driver unlocks the door intending to get in the vehicle but decides not to do so, or even when the driver leaves the vehicle without performing a locking operation. Also, the door can be automatically locked even when the driver leaves the vehicle while the door remains unlocked because of an erroneous operation of the remote control unit, for example, when the driver leaves the vehicle without noticing that a disarming operation has been accidentally carried out after the arming operation was performed.

What is claimed is:

1. A security apparatus for automatically locking a door, comprising:

a door lock switch for generating a door-unlocked signal when the door changes from a locked state to an unlocked state;

a sensor for detecting movement within a monitored area adjacent the door and for generating one of a first detection signal in response to detected movement within the monitored area, and a second detection signal in the absence of detected movement within the monitored area;

a security controller for generating a door lock command signal when the sensor continuously generates the second detection signal for a predetermined time period following the generation of the door-unlocked signal by the door lock switch; and door lock/unlock means for locking the door in response to the door lock command signal.

2. A security apparatus according to claim 1, wherein the sensor is a radar sensor.

3. A security apparatus according to claim 2, wherein the radar sensor comprises:

an electromagnetic wave radiating section for radiating an electromagnetic wave;

an electromagnetic wave agitation component extracting section for extracting a low-frequency agitation component signal from the radiated electromagnetic wave;

a reference level generating section for generating a reference level signal; and a level comparing section for comparing the low-frequency agitation component signal with the reference level signal and for generating the first detection signal when the low-frequency agitation component signal exceeds the reference level for a predetermined time period.

4. A security apparatus according to claim 3, wherein the level comparing section comprises:

a first comparing portion for comparing the electromagnetic wave agitation component signal extracted in the agitation component extracting section with a first reference signal, and for generating first level signals whenever the low-level agitation component signal exceeds the first reference signal;

an integration circuit for integrating the first level signals generated by the first comparing means, and for generating an integrated signal;

a second comparing portion for comparing the integrated signal with a second reference signal;

wherein the level comparing section generates the first detection signal when the integrated signal is greater than the second reference signal, and the level comparing section generates the second detection signal when the integrated signal is less than the second reference signal.

5. A security apparatus according to claim 1, wherein the security apparatus receives a remote control signal from a remote control unit, the security apparatus further comprising a receiving circuit for receiving the remote control signal via an antenna and for transmitting the received remote control signal to the security controller, wherein the security controller generates one of a door unlock command signal and the door lock command signal in response to the received remote control signal.

6. A security apparatus according to claim 5, wherein the received remote control signal includes a received ID code and an arming/disarming code, wherein the security controller compares the received ID code with a preset ID code stored in the security apparatus, and when the received ID code coincides with the preset ID code, generating one of the door unlock command signal and the door lock command signal in response to the arming/disarming code.

7. A security apparatus according to claim 5, wherein security controller includes a timing circuit for measuring an amount of time following the generation of the door-unlocked signal by the door lock switch, and wherein the security controller resets the timing circuit and disables the sensor when the door is locked or the sensor generates the first detection signal before the measured amount of time exceeds the predetermined time period.

8. A security apparatus according to claim 7, wherein the security controller enters an armed state upon generation of the door lock command signal, wherein, in the armed state, the security controller is connected to receive detection signals from a plurality of sensors and generates an alarm signal in response to a detection signal transmitted from one of the plurality of sensors.

9. A security system comprising:
   a remote control unit for transmitting a remote control signal; and
   a security apparatus comprising:
      a receiving circuit for receiving the remote control signal via an antenna;
      a door lock switch for generating a door-unlocked signal when the door changes from a locked state to an unlocked state;
      a sensor for detecting movement within a monitored area adjacent the door and for generating one of a first detection signal in response to detected movement within the monitored area, and a second detection signal in the absence of detected movement within the monitored area;
      a security controller for receiving the remote control signal from the receiving circuit, for generating one of a door lock command signal and a door unlock command signal in response to the received remote control signal, and for generating a door lock command signal when the sensor continuously generates the second detection signal for a predetermined time period following the generation of the door-unlocked signal by the door lock switch; and
      door lock/unlock means for locking the door in response to the door lock command signal and for unlocking the door in response to the door unlock command signal.

10. A security apparatus according to claim 9, wherein the sensor is a radar sensor.

11. A security apparatus according to claim 10, wherein the radar sensor comprises:
   an electromagnetic wave radiating section for radiating an electromagnetic wave;
   an electromagnetic wave agitation component extracting section for extracting a low-frequency agitation component signal from the radiated electromagnetic wave;
   a reference level generating section for generating a reference level signal; and
   a level comparing section for comparing the low-frequency agitation component signal with the reference level signal and for generating the first detection signal when the low-frequency agitation component signal exceeds the reference level for a predetermined time period.

12. A security apparatus according to claim 11, wherein the level comparing section comprises:
   a first comparing portion for comparing the electromagnetic wave agitation component signal extracted in the agitation component extracting section with a first reference signal, and for generating first level signals whenever the low-level agitation component signal exceeds the first reference signal;
   an integration circuit for integrating the first level signals generated by the first comparing means, and for generating an integrated signal;
   a second comparing portion for comparing the integrated signal with a second reference signal;
   wherein the level comparing section generates the first detection signal when the integrated signal is greater than the second reference signal, and the level comparing section generates the second detection signal when the integrated signal is less than the second reference signal.

13. A security apparatus according to claim 9, wherein the security controller includes a timing circuit for measuring an amount of time following the generation of the door-unlocked signal by the door lock switch, and wherein the security controller resets the timing circuit and disables the sensor when the door is locked or the sensor generates the first detection signal before the measured amount of time exceeds the predetermined time period.

14. A security apparatus according to claim 13, wherein the security controller enters an armed state upon generation of the door lock command signal, wherein, in the armed state, the security controller is connected to receive detection signals from a plurality of sensors and generates an alarm signal in response to a detection signal transmitted from one of the plurality of sensors.

15. A security system comprising:
   a remote control unit for transmitting a remote control signal including an ID code and an arming/disarming code; and
   a security apparatus comprising:
      a receiving circuit for receiving the remote control signal via an antenna;
      a door lock switch for generating a door-unlocked signal when the door changes from a locked state to an unlocked state;
      a sensor for detecting movement within a monitored area adjacent the door and for generating one of a first detection signal in response to detected movement within the monitored area, and a second detection signal in the absence of detected movement within the monitored area;
      a security controller for receiving the remote control signal from the receiving circuit, for comparing the ID code of the remote control signal with a preset ID code, and when the ID code of the remote control signal coincides with the preset ID code, for generating one of a door lock command signal and a door unlock command signal in response to the arming/disarming code, and for generating a door lock command signal when the sensor continuously generates the second detection signal for a predetermined time period following the generation of the door-unlocked signal by the door lock switch; and
      door lock/unlock means for locking the door in response to the door lock command signal and for unlocking the door in response to the door unlock command signal.

16. A security apparatus according to claim 15, wherein the proximity sensor is a radar sensor.

17. A security apparatus according to claim 16, wherein the radar sensor comprises:
   an electromagnetic wave radiating section for radiating an electromagnetic wave;
   an electromagnetic wave agitation component extracting section for extracting a low-frequency agitation component signal from the radiated electromagnetic wave;

a reference level generating section for generating a reference level signal; and a level comparing section for comparing the low-frequency agitation component signal with the reference level signal and for generating the first detection signal when the low-frequency agitation component signal exceeds the reference level for a predetermined time period.

18. A security apparatus according to claim 17, wherein the level comparing section comprises:

a first comparing portion for comparing the electromagnetic wave agitation component signal extracted in the agitation component extracting section with a first reference signal, and for generating first level signals whenever the low-level agitation component signal exceeds the first reference signal;

an integration circuit for integrating the first level signals generated by the first comparing means, and for generating an integrated signal;

a second comparing portion for comparing the integrated signal with a second reference signal;

wherein the level comparing section generates the first detection signal when the integrated signal is greater than the second reference signal, and the level comparing section generates the second detection signal when the integrated signal is less than the second reference signal.

19. A security apparatus according to claim 15, wherein the security controller includes a timing circuit for measuring an amount of time following the generation of the door-unlocked signal by the door lock switch, and wherein the security controller resets the timing circuit and disables the sensor when the door is locked or the sensor generates the first detection signal before the measured amount of time exceeds the predetermined time period.

20. A security apparatus according to claim 19, wherein the security controller enters an armed state upon generation of the door lock command signal, wherein, in the armed state, the security controller is connected to receive detection signals from a plurality of sensors and generates an alarm signal in response to a detection signal transmitted from one of the plurality of sensors.

* * * * *